United States Patent

Zigras

[11] Patent Number: 5,978,889
[45] Date of Patent: Nov. 2, 1999

[54] MULTIPLE DEVICE DATA TRANSFER UTILIZING A MULTIPORT MEMORY WITH OPPOSITE ORIENTED MEMORY PAGE ROTATION FOR TRANSMISSION AND RECEPTION

[75] Inventor: Sergio Zigras, Paramus, N.J.

[73] Assignee: Timeplex, Inc., Woodcliff Lake, N.J.

[21] Appl. No.: 08/964,771

[22] Filed: Nov. 5, 1997

[51] Int. Cl.$^6$ .................................................. G06F 13/14
[52] U.S. Cl. ............................ 711/149; 711/150; 711/168
[58] Field of Search ..................................... 711/149, 150, 711/168; 365/230.05

[56] References Cited

U.S. PATENT DOCUMENTS

| | | | |
|---|---|---|---|
| 4,120,048 | 10/1978 | Fuhrman | 365/239 |
| 4,891,794 | 1/1990 | Hush et al. | 365/189.04 |
| 5,142,638 | 8/1992 | Schiffleger | 395/425 |
| 5,177,706 | 1/1993 | Shinohara et al. | 365/189.04 |
| 5,191,553 | 3/1993 | Mizoguchi et al. | 365/189.06 |
| 5,226,010 | 7/1993 | Glider et al. | 365/189.04 |
| 5,299,158 | 3/1994 | Mason et al. | 365/189.04 |
| 5,335,199 | 8/1994 | Aoyama | 365/230.05 |
| 5,432,908 | 7/1995 | Heddes et al. | 395/250 |
| 5,434,818 | 7/1995 | Byers et al. | 365/189.04 |
| 5,450,604 | 9/1995 | Davies | 712/22 |
| 5,490,263 | 2/1996 | Hashemi | 395/476 |
| 5,513,139 | 4/1996 | Butler | 365/189.04 |
| 5,561,781 | 10/1996 | Braceras et al. | 711/131 |
| 5,586,299 | 12/1996 | Wakerly | 711/149 |
| 5,706,468 | 1/1998 | Hatanaka | 711/149 |
| 5,802,131 | 9/1998 | Morzano | 377/26 |
| 5,802,579 | 9/1998 | Crary | 711/149 |

Primary Examiner—John W. Cabeca
Assistant Examiner—Christopher S. Chow
Attorney, Agent, or Firm—Irwin Ostroff; Robert B. Ardis

[57] ABSTRACT

A quad-port random access memory (RAM) is accessed simultaneously by a input-output (I/O) device, a digital signal processor (DSP), and a system bus with no need for any request/granted handshake. The I/O device, DSP, and system bus all constitute respectively different data transferring devices. The RAM is provided with three memory pages which are rotated logically by 120 degrees during successive time slots. The first memory page is accessed by the I/O device, the second memory page is accessed by the DSP, and the third memory page is accessed by the system bus during a first time slot. During subsequent time slots, the memory pages of the RAM are rotated logically so that data transfer is stepped through a predetermined sequence of data transferring device and memory page combinations in successive time slots so that all three data transferring devices are permitted to access the RAM at all times. The sequence continues repetitively during subsequent time slots. Data transmission and reception use opposite rotation directions and opposite device and memory page combinations.

6 Claims, 3 Drawing Sheets

RECEIVE DIRECTION

TRANSMIT DIRECTION

RECEIVE DIRECTION

TRANSMIT DIRECTION

RECEIVE DIRECTION

TRANSMIT DIRECTION

MULTIPLE DEVICE DATA TRANSFER UTILIZING A MULTIPORT MEMORY WITH OPPOSITE ORIENTED MEMORY PAGE ROTATION FOR TRANSMISSION AND RECEPTION

FIELD OF THE INVENTION

This invention relates generally to memory paging methods and systems and, more particularly, to methods and systems in which memory is shared by more than two data transferring devices and to methods for operating such systems.

BACKGROUND OF THE INVENTION

When a dual-port memory is shared by two devices, such as an input-output (I/O) device and a digital signal processor (DSP), a conventional arrangement has had the devices access the memory in sequence. Although the memory is thus used full time, each device accesses it only half the time. If three devices were to share the memory, access would drop to only a third of the time for each of them and their respective performances would be decreased to a corresponding extent.

One way to increase both access time and performance, when only two devices share the memory, is to use an arrangement known as a "ping-pong" design. In such an arrangement, the dual-port memory is divided into two sections, and one device is accessing one section of the memory while the other device is accessing the other section of the memory. Thus, an I/O device accesses the first section during a first time segment while a DSP accesses the second. Then, during a second time segment, the I/O device accesses the second section while the DSP accesses the first. The process repeats itself during subsequent segments of time. This "ping-pong" arrangement is more efficient in that both the memory and the devices are working full time and there is no waiting requirement before either device is connected to the memory.

The nature of the problem would change significantly if three or more devices need access to the memory. In a "ping-pong" arrangement, with more than two devices requiring access to the memory, at least one device needs to be awaiting its turn at any given segment of time.

SUMMARY OF THE INVENTION

To avoid waiting in a memory paging system when multiple data transferring devices in excess of 2 need access to the memory, a multiple-port memory is used and is configured with as many memory pages as there are data transferring devices. In accordance with the invention, the memory pages are logically rotated after successive time segments, in one direction for data received from a local user and transmitted to an external network and in the opposite direction for data transmitted to a local user and received from an external network.

From one important aspect, the invention takes the form of a method for operating a memory paging system which comprises n data transferring devices, where n is an integer greater than 2, and a multi-port random access memory (RAM) used by all of the devices and comprising at least n memory pages. From this aspect of the invention, a method of accessing the RAM by the devices comprises the steps of transferring data between each of the devices and a respectively different one of the memory pages during each of a sequence of time slots, and rotating the pages of the RAM logically after each time slot so that data transfer is stepped through a predetermined sequence of device and memory page combinations in successive time slots.

From another important aspect, the invention takes the form of a memory paging system which comprises n data transferring devices and a multi-port RAM used by all of the devices which has at least n memory pages. From this aspect of the invention, an arrangement for accessing the RAM by each of the devices comprises means for transferring data between each of the devices and a respectively different one of the memory pages during each of a sequence of time slots and means for rotating the pages of the RAM logically after each time slot so that data transfer is stepped through a predetermined sequence of device and memory page combinations in successive time slots.

More specifically, in accordance with the invention, in a memory paging system which comprises three data transferring devices and a multi-port RAM (of which a quad-port RAM is a typical example) used by all three devices and having at least three memory pages, data is transferred between each of the devices and a respectively different one of three memory pages during each of a sequence of time slots, and the memory pages of the RAM are rotated logically so that data transfer is stepped through a predetermined sequence of device and memory page combinations during successive time slots. From a further aspect of the invention, the RAM pages are rotated logically in one direction (i.e., either clockwise or counterclockwise) during data reception by the paging system from a local source and in the opposite direction (i.e., either counterclockwise or clockwise) during data transmission by the paging system to that same user. For consistency, data received from a user by a paging system is defined as flowing in the "receive" direction and data transmitted to a user from a paging system is defined as flowing in the "transmit" direction.

Still more specifically and from another aspect of the invention, in a memory paging system which comprises an input/output (I/O) device, a digital signal processor (DSP), and a system bus, where each of the I/O device, DSP, and system bus constitutes a respectively different data transferring device, and a multi-port RAM used by all three devices and comprising three memory pages, data is transferred between the I/O device and a first memory page during one of a sequence of time slots, data is transferred between the DSP and a second of the memory pages during one of a sequence of time slots, data is transferred between the system bus and a third of the memory pages during one of a sequence of time slots, and the memory pages are rotated logically so that data transfer is stepped through a predetermined sequence of data transferring device and RAM memory page combinations during successive time slots. From this aspect of the invention, during each time slot in the receive direction, the I/O device stores data on a memory page, the DSP processes data previously stored on a memory page by the I/O device, and the system bus reads out data previously stored on a memory page by the DSP. Additionally, from this aspect of the invention, during each time slot in the transmit direction, the I/O device reads data from a memory page previously stored there by the DSP, the DSP writes to a memory page data previously stored there by the system bus, and the system bus writes data to a memory page.

From still another aspect of the invention, in a memory paging system which comprises first, second, and third data transferring devices, and a multi-port RAM used by all of the devices and comprising first, second, and third memory pages, the RAM is accessed by the devices during data flow in the receive direction by (1) transferring data between the first device and the first memory page, between the second device and the third memory page, and between the third device and the second memory page during a first of a sequence of time slots, (2) transferring data between the first device and the second memory page, between the second device and the first memory page, and between the third device and the third memory page during a second of the sequence of time slots, and (3) transferring data between first device and the third memory page, between the second device and the second memory page, and between the third device and the first memory page during a third of the sequence of time slots.

From yet another aspect of the invention, in a memory paging system which comprises first, second, and third data transferring devices, and a multi-port RAM used by all of the devices and comprising first, second, and third memory pages, the RAM is accessed by the devices during data flow in the transmit direction by (1) transferring data between the first device and the second memory page, between the second device and the third memory page, and between the third device and the first memory page during a first of a sequence of time slots, (2) transferring data between the first device and the third memory page, between the second device and the first memory page, and between the third device and the second memory page during a second of the sequence of time slots, and (3) transferring data between the first device and the first memory page, between the second device and the second memory page, and between the third device and the third memory page during a third of the sequence of time slots.

The invention may be more fully understood from the following detailed description of a specific example, considered in the light of the accompanying drawings and the appended claims.

DETAILED DESCRIPTION

Figure 1:
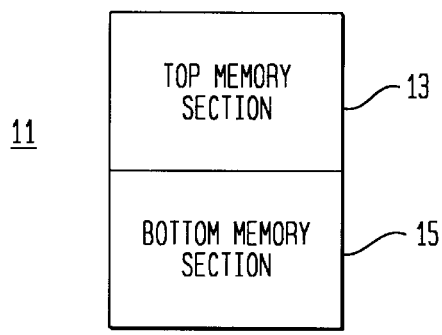
FIG. 1 is a block diagram of a prior art "ping-pong" arrangement for increasing access time when two devices are sharing a single RAM.

In FIG. 1, a dual-port RAM 11 is shown divided into a top memory section 13 and a bottom memory section 15. In the "ping-pong" arrangement known in the prior art, the entire space of RAM 11 is shared by two devices, e.g., a controller (not shown) and a DSP (not shown). At specific time intervals or time slots, e.g., of one millisecond each, each of the two devices accesses one of the two memory sections. For example, during a time slot t, the controller accesses top memory section 13 while the DSP accesses bottom memory section 15. A millisecond later, during the next time slot (t+1), the accesses reverse order. Then, the DSP accesses top memory section 13, while the controller accesses bottom memory section 15. The addressing of a memory section is identical for each of the two devices. The advantage of the arrangement is speed. While the controller accumulates new data for the DSP, the DSP processes the previous data accumulated by the controller. And vice versa, while the DSP processes the new accumulated data, the controller brings in new data. In this manner, both the controller and the DSP work full time and neither waits for the other to finish its job before it can access RAM 11. The "ping-pong" arrangement thus converts the more common sequential data processing to concurrent data processing.

Figure 2A:
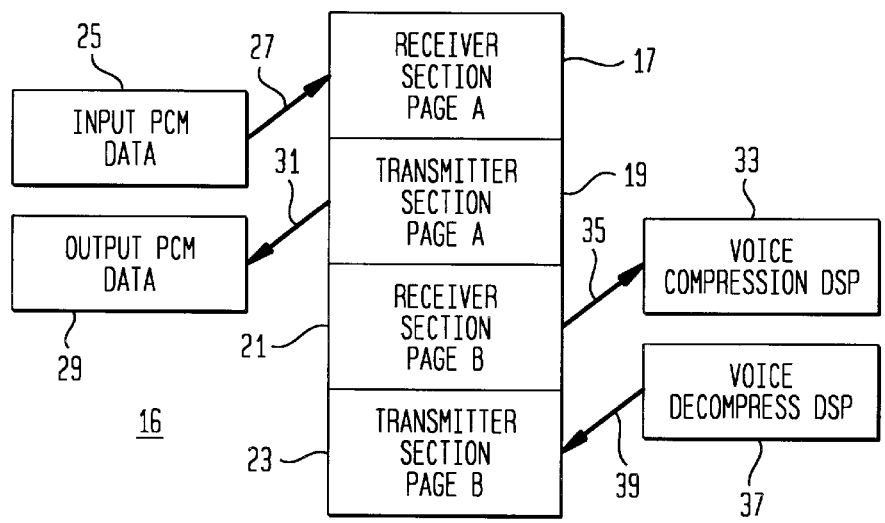
FIGS. 2A and 2B are expansions of the block diagram of FIG. 1, illustrating operation of a prior art "ping-pong" arrangement in both transmit and receive directions.
Figure 2B:
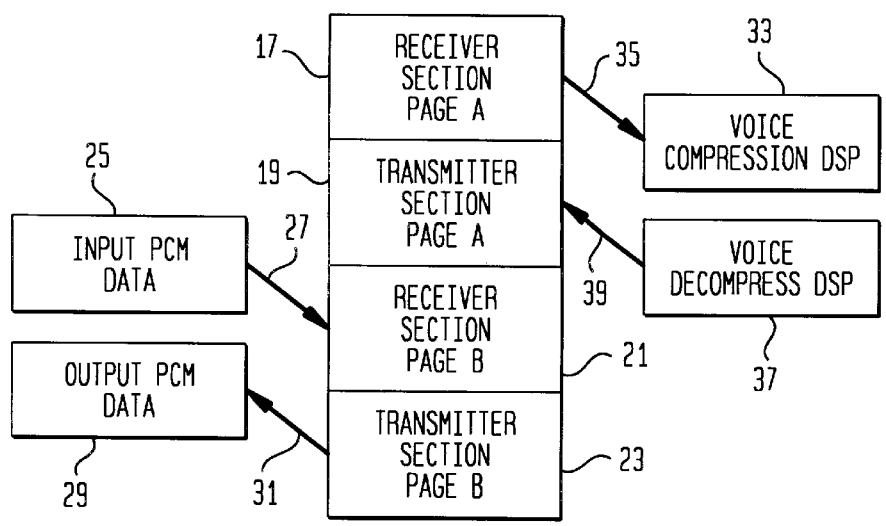

The known "ping-pong" memory paging arrangement is illustrated in more detail by a memory paging system 16 shown in FIGS. 2A and 2B. Specifically, FIG. 2A shows what happens within paging system 16 during a first time slot (time t) and FIG. 2B shows what happens within paging system 16 a millisecond later during the next time slot (time t+1).

In FIG. 2A, the dual-port RAM of paging system 16 is shown as having two memory pages labeled A and B, where memory page A is equivalent to top memory section 13 in FIG. 1 and memory page B is equivalent to bottom memory section 15. Of these, memory page A is divided into a receiver section 17 and a transmitter section 19. Memory page B is divided into a receiver section 21 and a transmitter section 23. The RAM is shared by two data transferring devices, an I/O device (not shown) and a DSP (not shown). In this example, the I/O device may be a pulse code modulation (PCM) voice/data interface that transmits and receives PCM digitized data at 64 Kbps. In the transmitting direction, the DSP compresses the PCM data to lower data rates (i.e., 8 Kbps). In the receiving direction, the DSP decompresses the data from 8 Kbps to PCM data at 64 Kbps.

In the FIG. 2A example, input PCM data 25 is supplied at time t to receiver section 17 of memory page A by a connector 27, while output PCM data 29 is received from transmitter section 19 of memory page A over a connector 31. At the same time, previously stored PCM input data is supplied from receiver section 21 of memory page B to a voice compression input 33 of the DSP by a connector 35, while decompressed voice is supplied to transmitter section 23 of memory page B from a voice decompression (DECOMPRESS) output 37 of the DSP over a connector 39.

FIG. 2B illustrates what happens one millisecond later during the next time slot (t+1). In FIG. 2B, input PCM data 25 is supplied to receiver section 21 of memory page B by connector 27, while output PCM data 29 supplied from transmitter section 23 of memory page B over connector 31. During this same time slot, previously stored PCM input data is supplied from receiver section 17 of memory page A to voice compression input 33 of the DSP by connector 35, while decompressed voice is supplied to transmitter section 19 of memory page A from voice decompression output 37 of the DSP over connector 39.

Again, both the I/O device and the DSP have full time access to the RAM and neither has to spend any time waiting for access.

Figure 3:
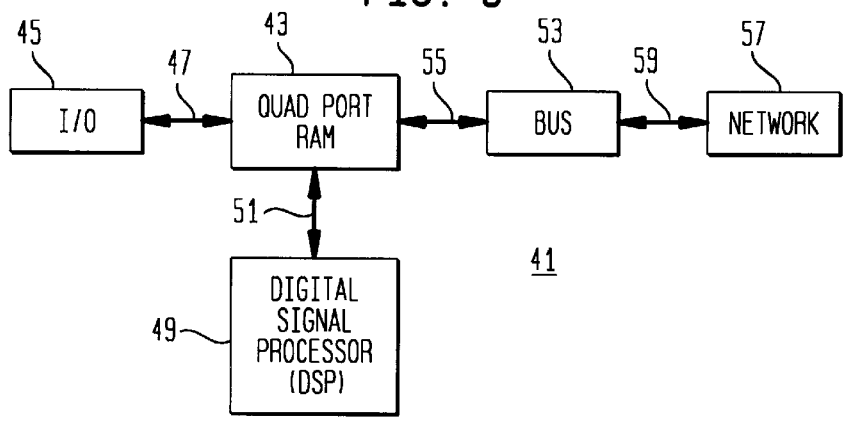
FIG. 3 is a block diagram of a memory paging system embodying the invention, where a single multi-port RAM is shared by an I/O device, a DSP, and a system bus.

FIG. 3 is a block diagram of a memory paging system 41 embodying the invention which has an ability both to receive data from a local source or user and to transmit data to that same local source or user. In FIG. 3, paging system 41 includes a quad-port RAM 43 (of which only three ports are used in the illustrated example). An I/O device 45, which interacts with a local source (not shown), is connected by way of a bidirectional connector 47 to one port of RAM 43. A DSP 49 is connected by way of a bidirectional connector 51 to another port of RAM 43. Finally, a system bus 53 is connected by way of a bidirectional connector 55 to still another port of RAM 43. An external network 57 is connected by way of a bidirectional connector 59 to system bus 53. In this arrangement, I/O device 45, DSP 49, and system bus 53 are three data transferring devices which exchange data in both directions with RAM 43. Data flow from left to right, where data is received from the local source by I/O device 45, is hereinafter referred to as the "receive direction," meaning that data is received from a local user connected to I/O device 45 Data flow from right to left, where data is transmitted from the local source by I/O device 45, is hereinafter referred to as the "transmit direction," meaning that data is transmitted from a local user connected to I/O device 45.

In FIG. 3, three ports of quad-port RAM 43 are used. RAM 43 is itself provided with three memory pages. In the receive direction (i.e., while paging system 41 is receiving data from a local user), during a first time slot t, data is transferred between I/O device 45 and a first of these memory pages, data is transferred between DSP 49 and a third of the memory pages, and data is transferred between system bus 53 and the second of the memory pages. In accordance with the invention, the memory pages are logically rotated in the clockwise direction by 120 degrees (i.e., 360/n degrees, where n=3) after the first time slot. During a second time slot (t+1), in the receive direction data is transferred between I/O device 45 and the second memory page, data is transferred between DSP 49 and the first memory page, and data is transferred between system bus 53 and the third memory page. In accordance with the invention, the memory pages are logically rotated in the clockwise direction by 120 degrees (i.e., 360/n degrees, where n=3) again after the second time slot. During a third time slot (t+2), data is transferred between I/O device 45 and the third memory page, data is transferred between DSP 49 and the second memory page, and data is transferred between system bus 53 and the first memory page. In accordance with the invention, the memory pages are logically rotated in the clockwise direction again by 120 degrees (i.e., 360/n degrees, where n=3) after the third time slot. The process continues repetitively during each subsequent time slot.

In the transmit direction in FIG. 3 (i.e., while paging system 41 is transmitting data to the local user), during a first time slot t, data is transferred between I/O device 45 and the second of the memory pages of RAM 43, data is transferred between DSP 49 and the third of these memory pages, and data is transferred between system bus 53 and the first of these memory pages. In accordance with the invention, the memory pages are logically rotated in the counterclockwise direction by 120 degrees (i.e., 360/n degrees, where n=3) after the first time slot. During a second time slot (t+1), in the transmit direction data is transferred between I/O device 45 and the third memory page, data is transferred between DSP 49 and the first memory page, and data is transferred between system bus 53 and the second memory page. In accordance with the invention, the memory pages are logically rotated in the counterclockwise direction by 120 degrees (i.e., 360/n degrees, where n=3) again after the second time slot. During a third time slot (t+2), in the transmit direction data is transferred between I/O device 45 and the first memory page, data is transferred between DSP 49 and the second memory page, and data is transferred between system bus 53 and the third memory page. In accordance with the invention, the memory pages are logically rotated in the counterclockwise direction again by 120 degrees (i.e., 360/n degrees, where n=3) after the third time slot. The process continues repetitively during each subsequent time slot.

Figure 4A:
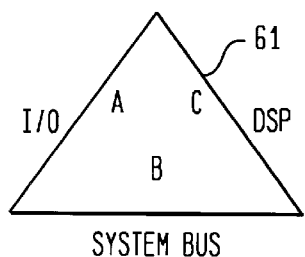
FIGS. 4A, 4B, and 4C illustrate how, in accordance with the invention, three pages of the multi-port RAM in FIG. 3 are rotated logically by 120 degrees in the clockwise direction in each of a succession of time slots during data reception from a local source.
Figure 4D:
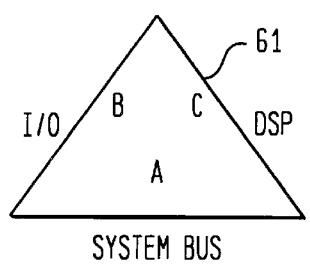
FIGS. 4D, 4E, and 4F illustrate how, in accordance with the invention, three pages of the multi-port RAM in FIG. 3 are rotated logically by 120 degrees in the counterclockwise direction in each of a succession of time slots during data transmission to a local source.
Figure 4B:
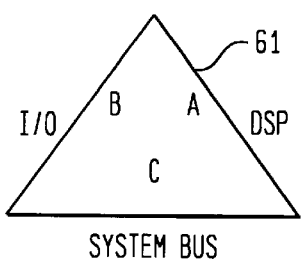
Figure 4E:
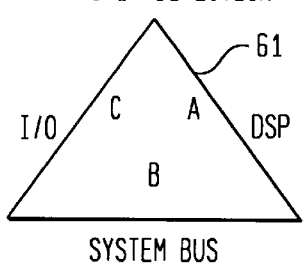
Figure 4C:
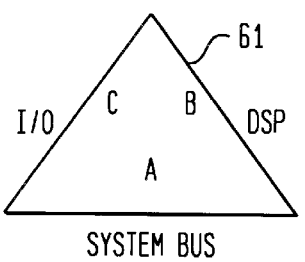

The progressive nature of the clockwise logical rotation for the receive direction of data flow according to the invention is illustrated graphically in FIGS. 4A, 4B, and 4C. FIG. 4A represents the first of a sequence of three time slots, FIG. 4B represents the second, and FIG. 4C represents the third. The process then repeats itself through each subsequent sequence of three time slots. In FIGS. 4A, 4B, and 4C, a triangle 61 represents a quad-port RAM and each of its legs represents a respective one of its three memory pages A, B, and C. Three devices interchanging data with the RAM are an I/O device, a DSP, and a system bus. During each of the three successive time slots, the I/O device, the DSP, and the system bus are shown adjacent the triangle leg representing the memory page with which they are interchanging data. There is no arbitration among the various devices because any of the three can access the RAM at any time without a request/granted handshake. In accordance with the invention, for data reception triangle 61 (representing the RAM) is rotated clockwise logically by 120 degrees at the conclusion of every 125 microsecond time slot.

In the receive direction, shown from left to right in FIG. 3, data flows from I/O device 45 to RAM 43. DSP 49 reads this data from RAM 43, processes the data to another form, and puts the data back into RAM 43. System bus 53 then reads out the processed data and distributes it to external network 57.

FIG. 4A illustrates operation of memory paging system 41 in the receive direction (left to right in FIG. 3) during a first time slot t. In the receive direction, during this first time slot, I/O device 45 stores user data into RAM page A. At the same time, DSP 49 processes data stored from I/O device 45 during the previous time slot (t−1) in RAM page C and stores the processed data back in RAM page C. Also at the same time, system bus 53 reads out data from RAM page B stored there during the previous time slot (t−1) by DSP 49.

FIG. 4B illustrates operation in the receive direction (left to right in FIG. 3) during a second time slot (t+1). In the receive direction, during this second time slot, I/O device 45 stores user data into RAM page B. At the same time, DSP 49 processes data stored from I/O device 45 during the previous time slot t in RAM page A and stores the processed data back in RAM page A. Also at the same time, system bus 53 reads out data from RAM page C stored there during the previous time slot t by DSP 49.

FIG. 4C illustrates operation in the receive direction (left to right in FIG. 3) during a third time slot (t+2). In the receive direction, during this third time slot, I/O device 45 stores user data into RAM page C. At the same time, DSP 49 processes data stored from I/O device 45 during the previous time slot (t+1) in RAM page B and stores the processed data back in RAM page B. Also at the same time, system bus 53 reads out data from RAM page A stored there during the previous time slot (t+1) by DSP 49.

As stated previously, the process repeats itself through successive time slots.

Figure 4F:
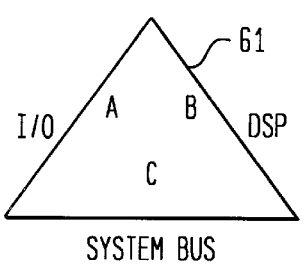

The progressive nature of the counterclockwise logical rotation for the transmit direction of data flow according to the invention is illustrated graphically in FIGS. 4D, 4E, and 4F. FIG. 4D represents the first of a sequence of three time slots, FIG. 4E represents the second, and FIG. 4F represents the third. The process then repeats itself through each subsequent sequence of three time slots. In FIGS. 4D, 4E, and 4F, triangle 61 once again represents a quad-port RAM and each of its legs represents a respective one of its three memory pages A, B, and C. Three devices interchanging data with the RAM are, once again, an I/O device, a DSP, and a system bus. During each of the three successive time slots, the I/O device, the DSP, and the system bus are shown adjacent the triangle leg representing the memory page with which they are interchanging data. Again, there is no arbitration among the various devices because any of the three can access the RAM at any time without a request/granted handshake. In accordance with the invention, triangle 61 (representing the RAM) is rotated counterclockwise logically by 120 degrees at the conclusion of every 125 microsecond time slot.

In the transmit direction, shown from right to left in FIG. 3, system bus 53 stores data collected from external network 57 into RAM 43. DSP 49 reads in this data, converts it to another form, and stores it back into RAM 43. I/O device 45 reads out the converted data and supplies it to a user.

FIG. 4D illustrates operation of memory paging system 41 in the transmit direction (right to left in FIG. 3) during a first time slot t. In the transmit direction, during this first time slot, I/O device 45 reads out of RAM page B user data stored there during the previous time slot (t–1) by DSP 49. At the same time, DSP 49 processes data stored from system bus 53 during the previous time slot (t–1) in RAM page C and stores the processed data back in RAM page C. Also at the same time, system bus 53 writes into RAM page A data from external network 57.

FIG. 4E illustrates operation in the transmit direction (right to left in FIG. 3) during a second time slot (t+1). In the transmit direction, during this second time slot, I/O device 45 reads out of RAM page C data stored there during the previous time slot t by DSP 49. At the same time, DSP 49 processes data stored from system bus 53 during the previous time slot t in RAM page A and stores the processed data back in RAM page A. Also at the same time, system bus 53 writes into RAM page B data from external network 57.

FIG. 4F illustrates operation in the transmit direction (right to left in FIG. 3) during a third time slot (t+2). In the transmit direction, during this third time slot, I/O device 45 reads out of RAM page A data stored there during the previous time slot (t+1) by DSP 49. At the same time, DSP 49 processes data stored from system bus 53 during the previous time slot (t+1) in RAM page B and stores the processed data back in RAM page B. Also at the same time, system bus 53 writes into RAM page C data from external network 57.

As stated previously, the process repeats itself through successive time slots.

Figure 5:
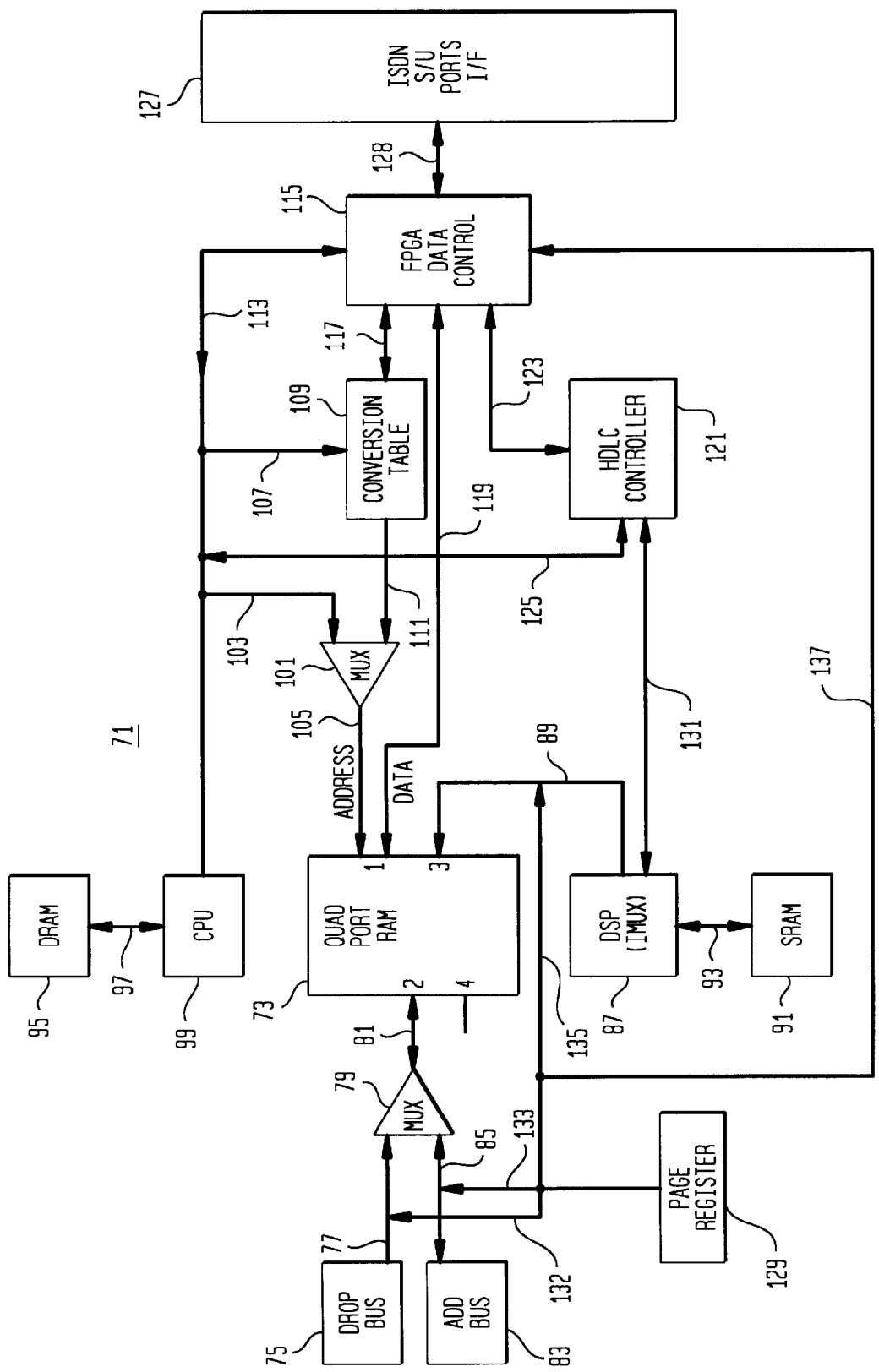
FIG. 5 is a block diagram of a memory paging system embodying the invention in which data is transferred between three memory pages of a multi-port RAM exchange and an I/O device, a DSP, and a system bus.

FIG. 5 is a more detailed block diagram of the embodiment of the invention illustrated in FIG. 3, where a memory paging system 71 uses a quad-port RAM 73. Of the four ports of RAM 73, only three (marked 1, 2, and 3) are used. The fourth port (marked 4) is not used. A quad-port RAM is used because three-port RAMs tend not to be commercially available.

In FIG. 5, a system bus (corresponding to system bus 53 in FIG. 3) includes a drop bus 75, which is connected by a line 77 to one input of an address and data multiplexer (MUX) 79, the output of which is connected by a line 81 to port 2 of RAM 73. Multiplexer 79 selects a party to which paging system 71 is connected. In addition, the system bus includes an add bus 83, which is connected by a line 85 to another input of multiplexer 79. The DSP circuitry includes an inverse multiplexing (IMUX) DSP 87, which is connected by a line 89 to port 3 of RAM 73. DSP 87 is controlled by a static random access memory (SRAM) 91, which is connected to DSP 87 by a line 93.

Control circuitry in FIG. 5 includes a dynamic random access memory (DRAM) 95, which is connected by a line 97 to a central processing unit (CPU) 99. An output of CPU 99 is connected to one input of an address multiplexer (MUX) 101 by a line 103, while the output of multiplexer 101 is connected to port 1 of RAM 73 by an address line 105. Address multiplexer 101 cooperates with address and data multiplexer 79 to select the party to which paging system 71 is connected. A line 107 also connects the output of CPU 99 to a conversion table 109. An output of conversion table 109 is connected by a line 111 to another input of multiplexer 101.

Drop bus 75 in memory paging system 71 is unidirectional in that it serves only to bring data into the paging system. Add bus 83 is bidirectional in that it serves both to bring in addresses and to take out data.

The output of CPU 99 is also connected through a line 113 to an input of a field programmable gate array (FPGA) data control unit 115. A two-way line 117 interconnects conversion table 109 and data control unit 115, and another two-way line 119 interconnects data control unit 115 and port 1 of RAM 73. A high level data link controller (HDLC) 121 is connected to data control unit 115 through a two-way line 123, and to CPU 99 through another two-way line 125.

An I/O interface (corresponding to I/O device 45 in FIG. 3) is provided in FIG. 5 by an integrated services digital network (ISDN) S/U ports interface (I/F) module 127. As the S/U symbol suggests, module 127 is equipped with either S ports or U ports, where S ports are used primarily in Europe and U ports primarily in the United States. A two-way line 128 interconnects data control unit 115 and interface module 127, while a line 131 connects DSP 87 with HDLC controller 121.

A page register 129, which may take the form of a 3-bit shift register, controls memory page rotation for quad-port RAM 73. A line 132 connects page register 129 to line 77, and hence to one input of multiplexer 79, while a line 133 connects page register 129 to line 85, and hence to the other input of multiplexer 79. A line 135 connects page register 129 to line 89, and hence to port 3 of quad-port RAM 73, while a line 137 connects page register 129 to FPGA data control unit 115.

In operation of memory paging system 71, user data enters in the receive direction at ISDN interface 127, traveling through FPGA data control unit 115 to quad-port RAM 73. DSP 87 manipulates the data, primarily through format control, and restores it to quad-port RAM 73. Add bus 83 takes the data out of DSP 87 and delivers it to an external network (not shown).

In the transmit direction, network data enters memory paging system 71 through drop bus 75 and goes into quad-port RAM 73. DSP 87 takes this data, reformats it, and puts it back into quad-port RAM 73. FPGA data control unit 115 pulls data out of quad-port RAM 73 and sends it to ISDN interface 127.

The memory pages of quad-port RAM 73 rotate under the control of page rotation register 129. Page rotation register 129 produces the outputs P0, P1, and P2 in successive time slots, as shown in TABLE 1:

TABLE 1

| Time Slot | P2 | P1 | P0 |
|---|---|---|---|
| t | 0 | 0 | 1 |
| t + 1 | 0 | 1 | 0 |
| t + 2 | 1 | 0 | 0 |

The process repeats itself continuously during succeeding time slots.

There are three data transferring devices that access quad-port RAM 73, i.e., (1) the I/O device comprising data control unit 115, (2) DSP 87, and (3) the system bus comprising drop bus 75, add bus 83, and multiplexer 79. These three devices each use two out of the three bits shown in TABLE 1, but in respectively different orders. In addition, the orders in which the bits are used changes for the transmit and receive directions for both the I/O device and the system bus. The DSP is in the middle of the page rotations and retains its bit order regardless of the receive or transmit direction. TABLES 2, 3, and 4 show the resulting bit mapping with respect to page rotation register bits. Page identifiers (A, B, and C) relate to the page identifiers shown for the receive direction in FIGS. 4A, 4B, and 4C and to those shown for the transmit direction in FIGS. 4D, 4E, and 4F.

TABLE 2

| (I/O BIT MAPPING) | | | | |
|---|---|---|---|---|
| Receive | | Transmit | | |
| P2 | P1 | P1 | P0 | Page |
| 0 | 0 | 0 | 0 | A |
| 0 | 1 | 0 | 1 | B |
| 1 | 0 | 1 | 0 | C |

TABLE 3

| (DSP BIT MAPPING) | | | | |
|---|---|---|---|---|
| Receive | | Transmit | | |
| P0 | P2 | P0 | P2 | Page |
| 0 | 0 | 0 | 0 | A |
| 0 | 1 | 0 | 1 | B |
| 1 | 0 | 1 | 0 | C |

TABLE 4

| (SYSTEM BUS BIT MAPPING) | | | | |
|---|---|---|---|---|
| Receive | | Transmit | | |
| P1 | P0 | P2 | P1 | Page |
| 0 | 0 | 0 | 0 | A |
| 0 | 1 | 0 | 1 | B |
| 1 | 0 | 1 | 0 | C |

Thus, memory pages A, B, and C logically rotate in the manner described in connection with FIGS. 4A, 4B, 4C, 4D, 4E, and 4F. As shown in FIGS. 4A, 4B, and 4C, memory pages A, B, and C rotate logically in the clockwise direction for paging system 71 operation in the receive direction. As shown in FIGS. 4D, 4E, and 4F, memory pages A, B, and C rotate logically in the counterclockwise direction for paging system 71 operation in the transmit direction.

It is to be understood that the embodiments of the invention which have been described are illustrative. Numerous other arrangements and modifications may be readily devised by those skilled in the art without departing from the spirit and scope of the invention.

I claim:

1. In a memory paging system which comprises n data transferring devices, where n is an integer greater than 2, and a multi-port random access memory (RAM) used by all of said devices and comprising at least n memory pages, where n of said memory pages are in use, a method of accessing said RAM by said devices comprising the steps of:

transferring data between each of said devices and a respectively different one of said memory pages during each of a sequence of time slots;

rotating the pages of said RAM logically in one direction for data reception by said system so that data transfer is stepped through a first predetermined sequence of device and memory page combinations during successive time slots; and rotating the pages of said RAM logically in the opposite direction for data transmission by said system so that data transfer is stepped through a second predetermined sequence of device and memory page combinations during the same successive time slots, where said second sequence is opposite to said first sequence.

2. In a memory paging system which comprises three data transferring devices, and a multi-port random access memory (RAM) used by all of said devices and comprising three memory pages, a method of accessing said RAM by said devices comprising the steps of:

transferring data between each of said devices and a respectively different one of said memory pages during each of a sequence of time slots;

rotating the pages of said RAM logically in one direction for data reception by said system so that data transfer is stepped through a first predetermined sequence of device and memory page combinations during successive time slots; and rotating the pages of said RAM logically in the opposite direction for data transmission by said system so that data transfer is stepped through a second predetermined sequence of device and memory page combinations during the same successive time slots, where said second sequence is opposite to said first sequence.

3. In a memory paging system which comprises an input/output (I/O) device, a digital signal processor (DSP), and a system bus, each of said I/O device, said DSP, and said system bus comprising a respectively different data transferring device, and a multi-port random access memory (RAM) used by said I/O device, said DSP, and said system bus and comprising three memory pages, a method of accessing said RAM by said devices comprising the steps of:

storing data from said I/O device on one of said memory pages during each of a succession of time slots during data reception by said system;

processing in said DSP data previously stored on one of said memory pages by said I/O device during each of said succession of time slots during data reception by said system;

reading onto said system bus data previously processed by said DSP on one of said memory pages during each of said succession of time slots during data reception by said system;

reading onto said I/O device data previously processed on one of said memory pages by said DSP during said each of said succession of time slots during data transmission by said system;

processing in said DSP data previously stored on one of said memory pages by said system bus during each of said succession of time slots during data transmission by said system;

writing data from said system bus onto one of said memory pages during each of said succession of time slots during data transmission by said system;

rotating the memory pages of said RAM logically in one direction for data reception by said system so that data transfer is stepped through a first predetermined sequence of data transferring device and RAM memory page combinations during successive time slots; and rotating the memory pages of said RAM logically in the opposite direction for data transmission by said system so that data transfer is stepped through a second predetermined sequence of data transferring device and RAM memory page combinations during successive time slots, where said second sequence is opposite to said first sequence.

4. A memory paging system comprising:

n data transferring devices, where n is an integer greater than 2;

a multi-port random access memory (RAM) used by all of said devices and comprising at least n memory pages, where n of said memory pages are in use;

means for transferring data between each of said devices and a respectively different one of said memory pages during each of a sequence of time slots;

means for rotating the pages of said RAM logically in one direction for data reception by said system so that data transfer is stepped through a first predetermined sequence of device and memory page combinations during successive time slots; and means for rotating the pages of said RAM logically in the opposite direction for data transmission by said system so that data transfer is stepped through a second predetermined sequence of device and memory page combinations during successive time slots, where said second sequence is opposite to said first sequence.

5. A memory paging system comprising:

three data transferring devices;

a multi-port random access memory (RAM) used by all of said devices and comprising three memory pages;

means for transferring data between each of said devices and a respectively different one of said memory pages during each of a sequence of time slots;

means for rotating the pages of said RAM logically in one direction for data reception by said system so that data transfer is stepped through a first predetermined sequence of device and memory page combinations during successive time slots; and means for rotating the pages of said RAM logically in the opposite direction for data transmission by said system so that data transfer is stepped through a second predetermined sequence of device and memory page combinations during successive time slots, where said second sequence is opposite to said first sequence.

6. A memory paging system comprising:

an input/output (I/O) device, a digital signal processor (DSP), and a system bus, each of said I/O device, said DSP, and said system bus comprising a respectively different data transferring device;

a multi-port random access memory (RAM) used by said I/O device, said DSP, and said system bus and comprising three memory pages;

means for storing data from said I/O device on one of said memory pages during each of a sequence of time slots during data reception by said system;

means for processing in said DSP data previously stored on one of said memory pages by said I/O device during each of said succession of time slots during data reception by said system;

means for reading onto said system bus data previously processed on one of said memory pages during each of said succession of time slots during data reception by said system;

means for reading onto said I/O device data previously stored on one of said memory pages by said DSP during said each of said succession of time slots during data transmission by said system;

means for processing in said DSP data previously stored on one of said memory pages by said system bus during each of succession of time slots during data transmission by said system;

means for writing data from said system bus onto one of said memory pages during each of said succession of time slots during data transmission by said system;

means for rotating the memory pages of said RAM logically in one direction for data reception by said system so that data transfer is stepped through a first predetermined sequence of data transferring device and RAM memory page combinations during successive time slots; and means for rotating the memory pages of said RAM logically in the opposite direction for data transmission by said system so that data transfer is stepped through a second predetermined sequence of data transferring device and RAM memory page combinations during successive time slots, where said second sequence is opposite to said first sequence.

* * * * *